(12) United States Patent
Ofversten et al.

(10) Patent No.: US 10,616,739 B2
(45) Date of Patent: Apr. 7, 2020

(54) METHOD AND APPARATUS FOR LOCAL DATA MONITORING AND ACTUATOR CONTROL IN AN INTERNET OF THINGS NETWORK

(71) Applicant: Nokia Technologies Oy, Espoo (FI)

(72) Inventors: Janne Ilmari Ofversten, Tampere (FI); Pekka Eerikki Leinonen, Turku (FI)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 15/531,560

(22) PCT Filed: Dec. 17, 2014

(86) PCT No.: PCT/IB2014/067044
§ 371 (c)(1),
(2) Date: May 30, 2017

(87) PCT Pub. No.: WO2016/097822
PCT Pub. Date: Jun. 23, 2016

(65) Prior Publication Data
US 2017/0331860 A1    Nov. 16, 2017

(51) Int. Cl.
*H04W 4/80* (2018.01)
*H04L 29/08* (2006.01)
(Continued)

(52) U.S. Cl.
CPC .............. *H04W 4/80* (2018.02); *H04L 5/006* (2013.01); *H04L 63/06* (2013.01); *H04L 63/306* (2013.01);
(Continued)

(58) Field of Classification Search
CPC ........... H04W 4/80; H04W 4/70; H04W 4/38; H04W 12/08; H04L 67/12; H04L 63/306; H04L 63/06; H04L 5/006; H04L 67/125
See application file for complete search history.

(56) References Cited

U.S. PATENT DOCUMENTS 8,655,441 B2    2/2014  Fletcher et al.
2011/0066850 A1*  3/2011  Ekberg ................ H04L 63/0209
                                                   713/162
(Continued)

FOREIGN PATENT DOCUMENTS

CN          203143857 U    8/2013
EP          2733502 A1     5/2014
(Continued)

OTHER PUBLICATIONS

"Shaping the Wireless Future with Low Energy Applications and Systems", ConnectBlue, Retrieved on Apr. 18, 2017, Webpage available at : http://www.connectblue.com/press/articles/shaping-the-wireless-future-with-low-energy-applications-and-systems/.
(Continued)

*Primary Examiner* — Nelson S. Giddins
(74) *Attorney, Agent, or Firm* — Mintz Levin Cohn Ferris Glovsky and Popeo, P.C.

(57) ABSTRACT

A method, apparatus, and computer program product are disclosed for locally monitoring Internet of Things (IoT) devices without the need to interact via an IoT network intermediary. An example method includes receiving signals transmitted by one or more devices and identifying, by a communication device, a nearest device of the one or more devices based on the received signals. The method subsequently includes intercepting, by the communication device, advertisements transmitted by the nearest device, and causing display, based on the intercepted advertisements, of state information of the nearest device.

20 Claims, 5 Drawing Sheets

(51) Int. Cl.
*H04W 4/38* (2018.01)
*H04W 4/70* (2018.01)
*H04W 12/08* (2009.01)
*H04L 5/00* (2006.01)
*H04L 29/06* (2006.01)

(52) U.S. Cl.
CPC ............ *H04L 67/12* (2013.01); *H04L 67/125* (2013.01); *H04W 4/38* (2018.02); *H04W 4/70* (2018.02); *H04W 12/08* (2013.01)

(56) References Cited

U.S. PATENT DOCUMENTS

| | | | | |
|---|---|---|---|---|
| 2011/0140864 A1* | 6/2011 | Bucci | ..................... | G08C 17/02 340/10.42 |
| 2013/0157568 A1* | 6/2013 | Jain | ..................... | H04W 4/80 455/41.2 |
| 2013/0251216 A1* | 9/2013 | Smowton | ..................... | H04L 9/3231 382/118 |
| 2013/0298039 A1* | 11/2013 | Mestre | ..................... | G06F 3/0484 715/753 |
| 2014/0351446 A1* | 11/2014 | Cho | ..................... | H04L 67/141 709/227 |
| 2014/0357293 A1* | 12/2014 | Tsaur | ..................... | H04W 64/00 455/456.1 |
| 2014/0362728 A1* | 12/2014 | Krochmal | ..................... | H04B 7/26 370/254 |
| 2016/0248905 A1* | 8/2016 | Miller | ..................... | H04W 4/021 |

FOREIGN PATENT DOCUMENTS

| | | |
|---|---|---|
| WO | 2013/175741 A1 | 11/2013 |
| WO | 2014/027273 A1 | 2/2014 |

OTHER PUBLICATIONS

Chaudhri et al., "Open Data Kit Sensors: Mobile Data Collection with Wired and Wireless Sensors", Proceedings of the 2nd ACM Symposium on Computing for Development, Mar. 11-12, 2012, 10 Pages.

"From Assets to Analytics: Supplementing SCADA Systems with Cloud-Based Remote Monitoring Platforms", Autodesk Fusion Connect, Retrieved on Apr. 18, 2017, Webpage available at : http://autodeskfusionconnect.com/from-assets-to-analytics-supplementing-scada-systems-with-cloud-based-remote-monitoring-platforms/.

International Search Report and Written Opinion received for corresponding Patent Cooperation Treaty Application No. PCT/IB2014/067044, dated Feb. 25, 2015, 10 pages.

* cited by examiner

METHOD AND APPARATUS FOR LOCAL DATA MONITORING AND ACTUATOR CONTROL IN AN INTERNET OF THINGS NETWORK

RELATED APPLICATION

This application was originally filed as PCT Application No. PCT/IB2014/067044 filed Dec. 17, 2014.

TECHNOLOGICAL FIELD

Example embodiments of the present invention relate generally to the Internet of Things and, more particularly, to a method and apparatus for locally monitoring and controlling devices in an Internet of Things environment.

BACKGROUND

The Internet of Things (IoT), which refers to the interconnection of uniquely identifiable embedded computing devices within the Internet infrastructure, is quickly growing, and some estimates suggest that by 2020 there will be 50 billion Internet connected devices. As part of this growth, emerging IoT platforms now provide the technical infrastructure to build and utilize autonomous wireless sensor devices. Two main differentiators that make this possible are the use of energy harvesting by IoT devices and the use of a very low power custom connectivity solution based on Bluetooth® Low Energy (BLE) communication. Unique benefits of BLE connectivity are very low power consumption, the ability to connect an unlimited number of devices to a BLE hub, and the ability to facilitate handovers between BLE hubs. Using the BLE communication protocol, it is also possible to control actuator devices from the cloud.

BRIEF SUMMARY

In IoT networks, sensor data is often delivered to a cloud service via a hub device that converts BLE advertisement messages to HTTP data. The main user interface for viewing data and controlling the devices is a web interface provided by the cloud service. For many use cases (such as the remote monitoring and control of buildings or factories) this is convenient as all data and control is centralized in one place. However, in other situations, data needs to be viewed locally, such as when performing testing during initial installation. In large IoT networks, equipment assembly and testing is preferably completed before system configuration and by different people. Moreover, in networks where there are hundreds or thousands of devices advertising data using BLE, it can be difficult to identify a particular local device to monitor even if an operator is able to see the local device nearby.

Example embodiments address these issues by enabling the local monitoring of IoT devices without the need to interact via the cloud. This makes it easier and more convenient to install and test large and complex sensor-to-cloud IoT systems before (or after) they are configured as functional parts of the IoT network. Moreover, certain embodiments enable local monitoring without a cloud connection, which makes testing possible in situations when networks are down or require additional security. Additionally, by generating a visual and/or audio indication when the device is locally monitored, example embodiments make it easier to find nearby sensors that a user would be most interested in.

In a first example embodiment, a method is provided. The method includes receiving signals transmitted by one or more devices, and identifying, by a communication device, a nearest device of the one or more devices based on the received signals. The method further includes intercepting, by the communication device, advertisements transmitted by the nearest device, and causing display, based on the intercepted advertisements, of state information of the nearest device. In this regard, at least one of the one or more devices may be bonded to an IoT network.

In some embodiments of the method, identifying the nearest device of the one or more devices based on received signals may include averaging signal strengths of the received signals over a predetermined period of time, and identifying the device that transmitted the signal having the greatest signal strength, wherein the nearest device comprises the device that transmitted the signal having the greatest signal strength. In this regard, the signal strengths of the received signals comprise BLE Received Signal Strength Indications (RSSI) measured by the communication device.

In an instance in which the advertisements are encrypted, the method may further include retrieving a security key for the nearest device, and decrypting the intercepted advertisements using the retrieved security key, wherein causing display of the state information of the nearest device is based on decrypting the intercepted advertisements.

In some embodiments, the method further includes causing establishment of a BLE connection with the nearest device. Once established, the method may include causing transmission, to the nearest device, of a control message. This control message may be an instruction to the nearest device to generate a visual and/or audio indication. In other embodiments, the control message may be an actuation message. The actuation message may be an instruction to the nearest device to change its physical state. Alternatively, the actuation message may be an instruction to actuate another device operatively controlled by the nearest device. Additionally or alternatively, these embodiments may include receiving, after causing transmission of the control message, updated state information from the nearest device, and causing transmission, by the communication device and to an IoT network, of the updated state information.

In a second example embodiment, an apparatus is provided. The apparatus includes at least one processor and at least one memory including computer program code, with the at least one memory and the computer program code configured to, with the at least one processor, cause the apparatus to receive signals transmitted by one or more devices, and identify a nearest device of the one or more devices based on the received signals. The computer program code is further configured to, with the at least one processor, cause the apparatus to intercept advertisements transmitted by the nearest device, and display, based on the intercepted advertisements, state information of the nearest device. In this regard, at least one of the one or more devices may be bonded to an IoT network.

In some embodiments of the apparatus, the at least one memory and the computer program code cause the apparatus to identify the nearest device of the one or more devices by causing the apparatus to average signal strengths of the received signals over a predetermined period of time, and identify the device that transmitted the signal having the greatest signal strength, wherein the nearest device comprises the device that transmitted the signal having the greatest signal strength. In this regard, the signal strengths of the received signals comprise BLE RSSI measured by the communication device.

In an instance in which the advertisements are encrypted, the at least one memory and the computer program code may further cause the apparatus to retrieve a security key for the nearest IoT device, and decrypt the intercepted advertisements using the retrieved security key, wherein displaying the state information of the nearest IoT device is based on decrypting the intercepted advertisements.

In some embodiments, the at least one memory and the computer program code causes the apparatus to establish BLE connection with the nearest device. Once established, the at least one memory and the computer program code may cause the apparatus to transmit a control message to the nearest device. This control message may be an instruction to the nearest device to generate a visual and/or audio indication. In other embodiments, the control message may be an actuation message. The actuation message may be an instruction to the nearest device to change its physical state. Alternatively, the actuation message may be an instruction to actuate another device operatively controlled by the nearest device. Additionally or alternatively, the at least one memory and the computer program code may further cause the apparatus to receive, after causing transmission of the control message, updated state information from the nearest IoT device, and transmit the updated state information to the IoT network.

In a third example embodiment, a computer program product is provided. The computer program product includes at least one non-transitory computer-readable storage medium having computer-executable program code portions stored therein, with the computer-executable program code portions comprising program code instructions that, when executed, cause an apparatus to receive signals transmitted by one or more devices, and identify a nearest device of the one or more devices based on the received signals. The program code instructions, when executed, further cause the apparatus to intercept advertisements transmitted by the nearest device, and display, based on the intercepted advertisements, state information of the nearest device. In this regard, at least one of the one or more devices may be bonded to an IoT network.

In some embodiments of the computer program product, the program code instructions, when executed, further cause the apparatus to identify the nearest device of the one or more devices by causing the apparatus to average signal strengths of the received signals over a predetermined period of time, and identify the device that transmitted the signal having the greatest signal strength, wherein the nearest device comprises the device that transmitted the signal having the greatest signal strength. In this regard, the signal strengths of the received signals comprise BLE RSSI measured by the communication device.

In an instance in which the advertisements are encrypted, the program code instructions, when executed, further cause the apparatus to retrieve a security key for the nearest device, and decrypt the intercepted advertisements using the retrieved security key, wherein displaying the state information of the nearest device is based on decrypting the intercepted advertisements.

In some embodiments, the program code instructions, when executed, further cause the apparatus to establish BLE connection with the nearest device. Once established, the program code instructions, when executed, further cause the apparatus to transmit a control message to the nearest device. This control message may be an instruction to the nearest device to generate a visual and/or audio indication. In other embodiments, the control message may be an actuation message. The actuation message may be an instruction to the nearest device to change its physical state. Alternatively, the actuation message may be an instruction to actuate another device operatively controlled by the nearest device. Additionally or alternatively, the program code instructions, when executed, further cause the apparatus to receive, after causing transmission of the control message, updated state information from the nearest IoT device, and transmit the updated state information to the IoT network.

In a fourth example embodiment, an apparatus is provided. The apparatus includes means for receiving signals transmitted by one or more devices, and means for identifying a nearest device of the one or more devices based on the received signals. The apparatus further includes means for intercepting advertisements transmitted by the nearest device, and means for displaying, based on the intercepted advertisements, state information of the nearest device. In this regard, at least one of the one or more devices may be bonded to an IoT network.

In some embodiments of the apparatus, the means for identifying the nearest device of the one or more devices comprises means for averaging signal strengths of the received signals over a predetermined period of time, and means for identifying the device that transmitted the signal having the greatest signal strength, wherein the nearest device comprises the device that transmitted the signal having the greatest signal strength. In this regard, the signal strengths of the received signals comprise BLE RSSI measured by the communication device.

In an instance in which the advertisements are encrypted, the apparatus further includes means for retrieving a security key for the nearest device, and means for decrypting the intercepted advertisements using the retrieved security key, wherein displaying the state information of the nearest device is based on decrypting the intercepted advertisements.

In some embodiments, the apparatus includes means for establishing a BLE connection with the nearest device. Once established, the apparatus includes means for transmitting a control message to the nearest device. This control message may be an instruction to the nearest device to generate a visual and/or audio indication. In other embodiments, the control message may be an actuation message. The actuation message may be an instruction to the nearest device to change its physical state. Alternatively, the actuation message may be an instruction to actuate another device operatively controlled by the nearest device. Additionally or alternatively, the apparatus may include means for receiving, after causing transmission of the control message, updated state information from the nearest device, and means for transmitting the updated state information to the IoT network.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale, and wherein.

DETAILED DESCRIPTION

Figure 1:
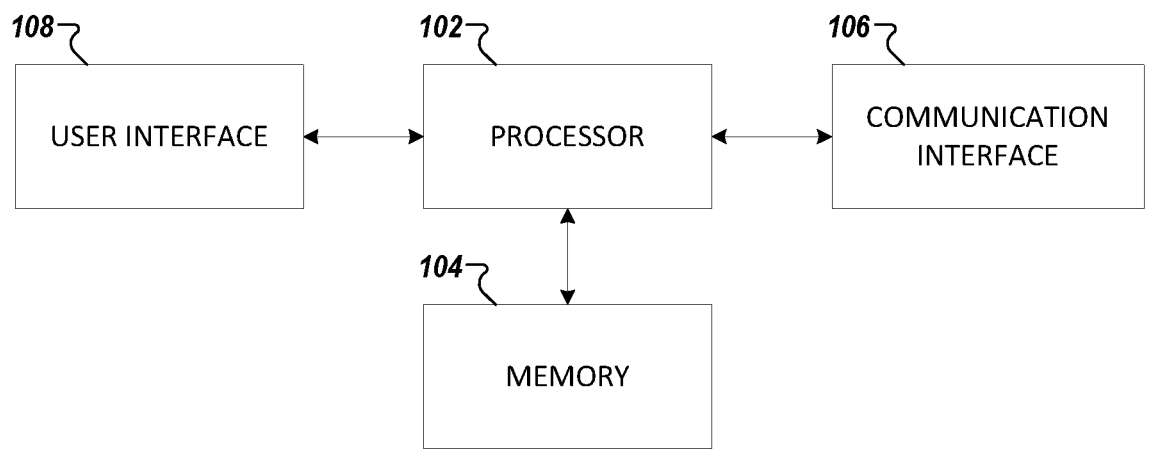
FIG. 1 illustrates a block diagram of an apparatus that may be specifically configured in accordance with example embodiments of the present invention.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus, and computer program product are provided in accordance with an example embodiment of the present invention to locally monitor IoT devices without the need to interact via the cloud. The method, apparatus, and computer program product may be embodied by any of a variety of devices. For example, the devices may include any of a variety of mobile terminals, such as a portable digital assistant (PDA), mobile telephone, smartphone, mobile television, gaming device, laptop computer, camera, tablet computer, video recorder, web camera, or any combination of the aforementioned devices. Additionally or alternatively, the computing device may include fixed computing devices, such as a personal computer or a computer workstation. Still further, the method, apparatus, and computer program product of an example embodiment may be embodied by a networked device, such as a server or other network entity, configured to communicate with one or more devices, such as one or more client devices.

Regardless of the type of device, an apparatus 100 that may be specifically configured to locally monitor IoT devices without the need to interact via the cloud is illustrated in FIG. 1. It should be noted that while FIG. 1 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 102, a memory 104, and optionally a communication interface 106 and a user interface 108. The apparatus 100 may be embodied by a computing device, such as a computer terminal. However, in some embodiments, the apparatus may be embodied as a chip or chip set. In other words, the apparatus 100 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The apparatus 100 may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor 102 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 102 may include one or more processing cores configured to perform independently. A multi-core processor may enable multiprocessing within a single physical package. Additionally or alternatively, the processor 102 may include one or more processors configured in tandem via the bus to enable independent execution of instructions, pipelining, and/or multithreading.

In an example embodiment, the processor 102 may be configured to execute instructions stored in the memory 104 or otherwise accessible to the processor 102. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 102.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor). The memory 104 may be configured to store information, data, content, applications, instructions, or the like, for enabling the apparatus to carry out various functions in accordance with an example embodiment of the present invention. For example, the memory 104 could be configured to buffer input data for processing by the processor 102. Additionally or alternatively, the memory 104 could be configured to store instructions for execution by the processor 102.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface 106 may include, for example, an antenna (or multiple antennas) and supporting hardware and/or software for enabling communications with a wireless communication network. Additionally or alternatively, the communication interface 106 may include the circuitry for interacting with the antenna(s) to cause transmission of signals via the antenna(s) or to handle receipt of signals received via the antenna(s). In some environments, the communication interface 106 may additionally or alternatively support wired communication. As such, for example, the communication interface 106 may include a communication modem and/or other hardware/software for supporting communication via cable, digital subscriber line (DSL), universal serial bus (USB), or other mechanisms.

In some embodiments, the apparatus 100 may include a user interface 108 that may, in turn, be in communication with processor 102 to provide output to the user and, in some embodiments, to receive an indication of a user input. As such, the user interface 108 may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor 102 and/or user interface circuitry comprising the processor may be configured to control one or more functions of one or more user interface elements through computer program instructions (e.g., software and/or firmware) stored on a memory accessible to processor 102 (e.g., memory 104, and/or the like).

Figure 2:
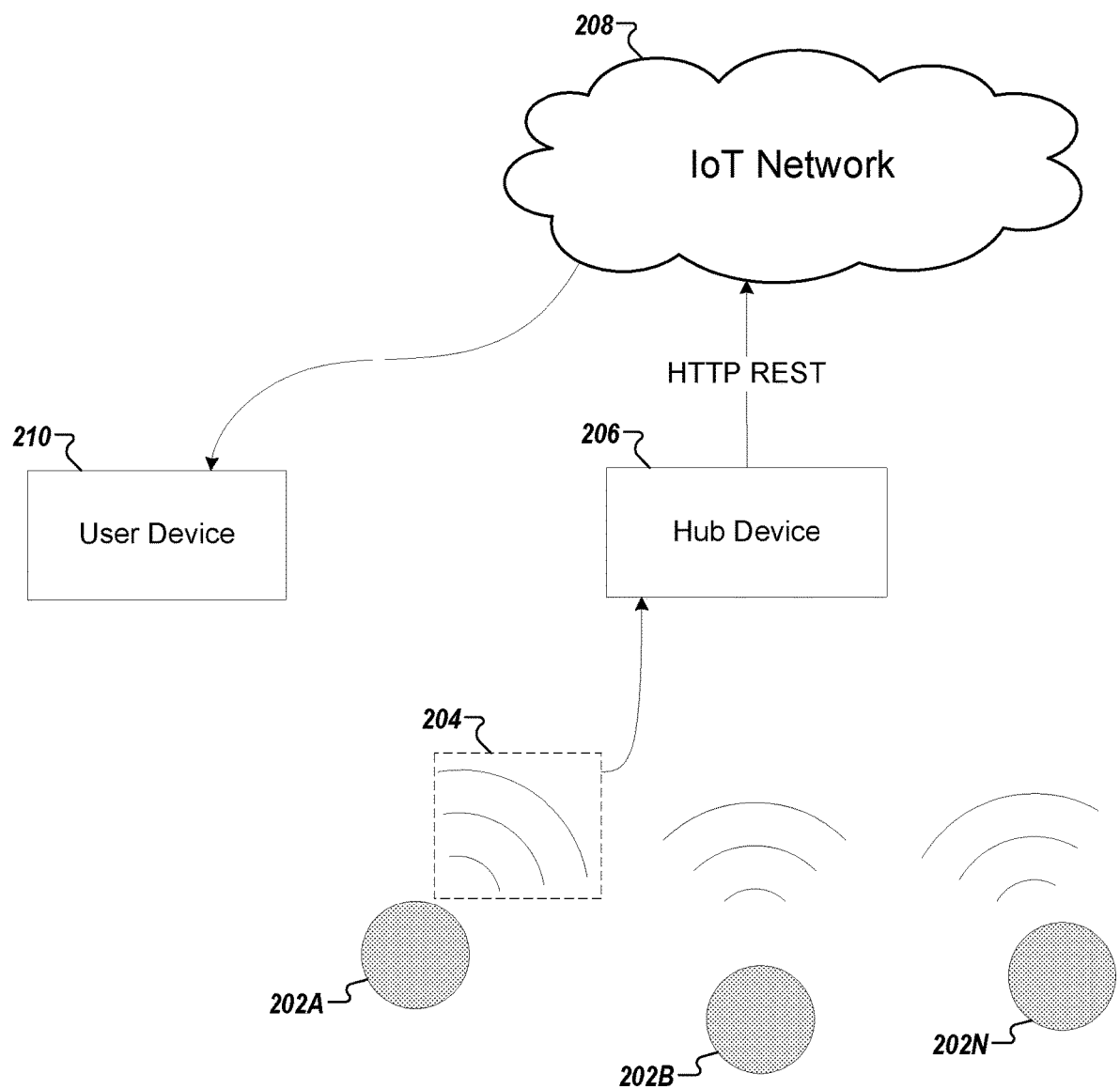
FIG. 2 illustrates a network diagram showing a traditional mechanism for monitoring IoT devices.

Turning now to FIG. 2, a system diagram of a data monitoring architecture 200 is illustrated. As shown in FIG. 2, a series of devices (202A, 202B, . . . , 202N) may periodically transmit advertisements via wireless BLE broadcast (e.g., 204). When one of these a device 202 is bonded to an IoT network, that device may be referred to herein as an IoT device. These broadcasts are received by a hub device 206, which converts the BLE advertisement messages into HTTP data that is delivered via a RESTful service to a cloud service IoT network 208. The IoT network 208, in turn, provides a user interface enabling a user, via a user device 210, to view data regarding a particular IoT device (e.g., 202A) and control the IoT device via a web interface provided by the IoT network 208. As noted previously, this is convenient for many use cases (such as the remote monitoring and control of buildings or factories) as all data and control is centralized in one place. However, in other situations, data needs to be viewed locally, such as when performing testing during initial installation. In large IoT networks, equipment assembly and testing is preferably completed before system configuration and by different people. Moreover, in networks where there are hundreds or thousands of devices advertising data using BLE, it can be difficult to identify a particular local device to monitor.

Figure 3:
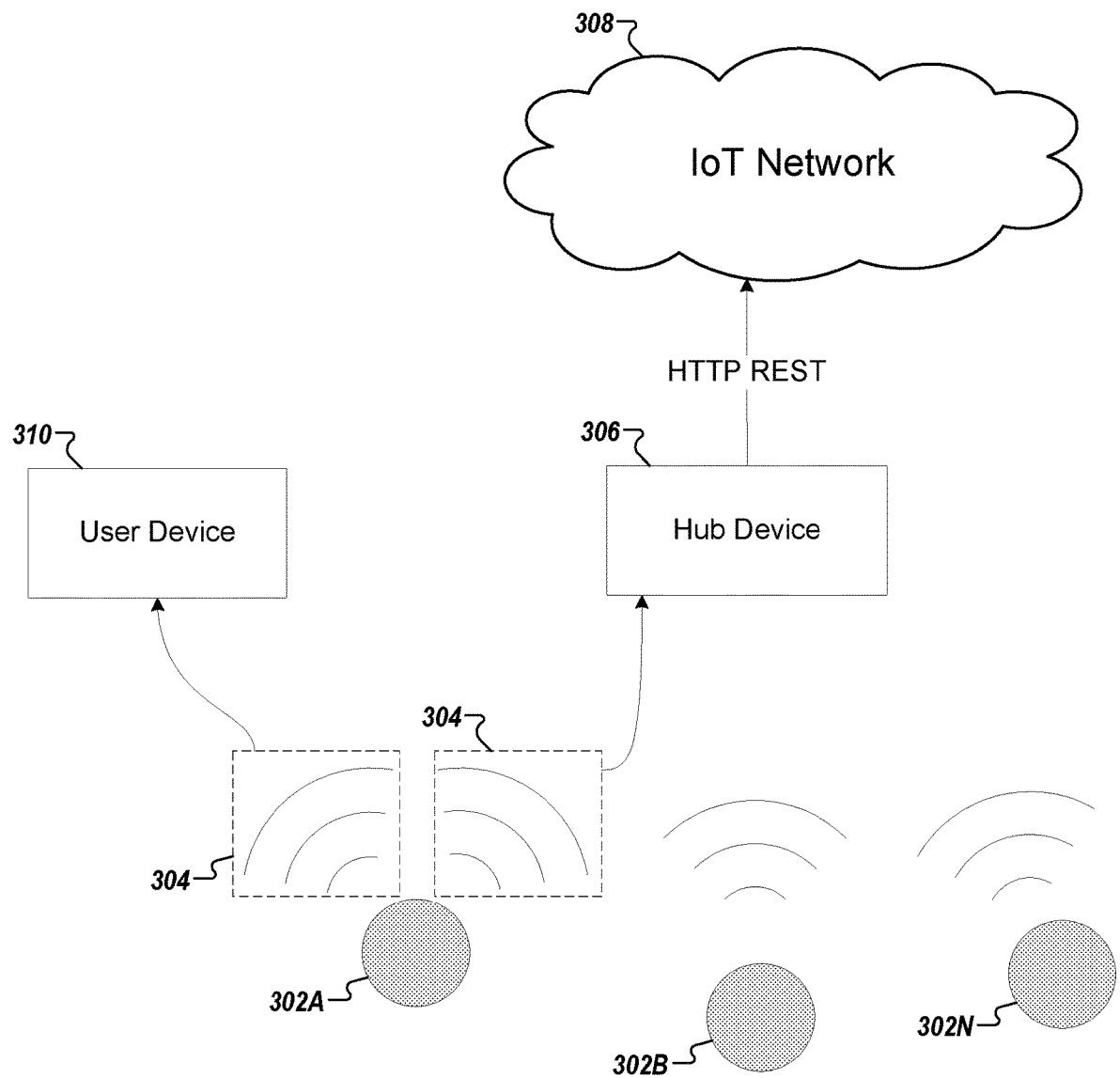
FIG. 3 illustrates a network diagram showing an improved mechanism for monitoring local devices, in accordance with example embodiments of the present invention.

Turning now to FIG. 3, an improved data monitoring architecture 300 is illustrated that is used by embodiments described herein. As with the diagram shown in FIG. 2, a series of devices (302A, 302B, . . . , 302N) may periodically transmit advertisements via wireless BLE broadcast (e.g., 304), and these advertisements may be received by a hub device 306 and transmitted in sequence to an IoT network 308. However, as shown in FIG. 3, local monitoring can be performed by a user via the user device 310 without requiring the intermediate routing through the IoT network 308. This is enabled using two steps not contemplated in traditional data monitoring architectures.

First, the nearest device 302A may be selected by the user device 310 based on BLE Received Signal Strength Indication (RSSI). In this regard, the user device 310 may average received signals over a short period of time to filter out high and low peaks in the signal strength. Second, an application on the user device 310 may intercept the advertisements coming from the nearest device 302A and present them to the user via a user interface of the user device 310. In some embodiments, the user device 310 must store the security key of the sending device, which ensures that only authorized user devices 310 can view the advertisement data transmitted by the device 302A.

It should be understood, however, that the advertisements may be simultaneously received by both the user device 310 and the hub device 306, and the hub device may typically send data to the IoT network 308. Optionally, the device 302A that is being monitored can provide a visual and/or audio indication to the user that confirms that the device 302A is the source of the advertisements that are intercepted. Example visual indicators include activating a light, light bulb, or sensor display. Example audio indicators include generating a sound effect (e.g., a beep or other alternative) or speech (in some embodiments, providing the visual and/or audio indication may require prior establishment of a BLE connection). In situations where the user locally controls the device 302A, the mobile application stored on the user device 310 can establish a BLE connection using a proprietary protocol to send control messages to the device 302A. If the device 302A is bonded to the IoT network 308, the mobile application may also establish a separate connection with the IoT network 308 to notify the IoT network 308 that the state of the IoT device 302A has been changed locally.

Figure 4:
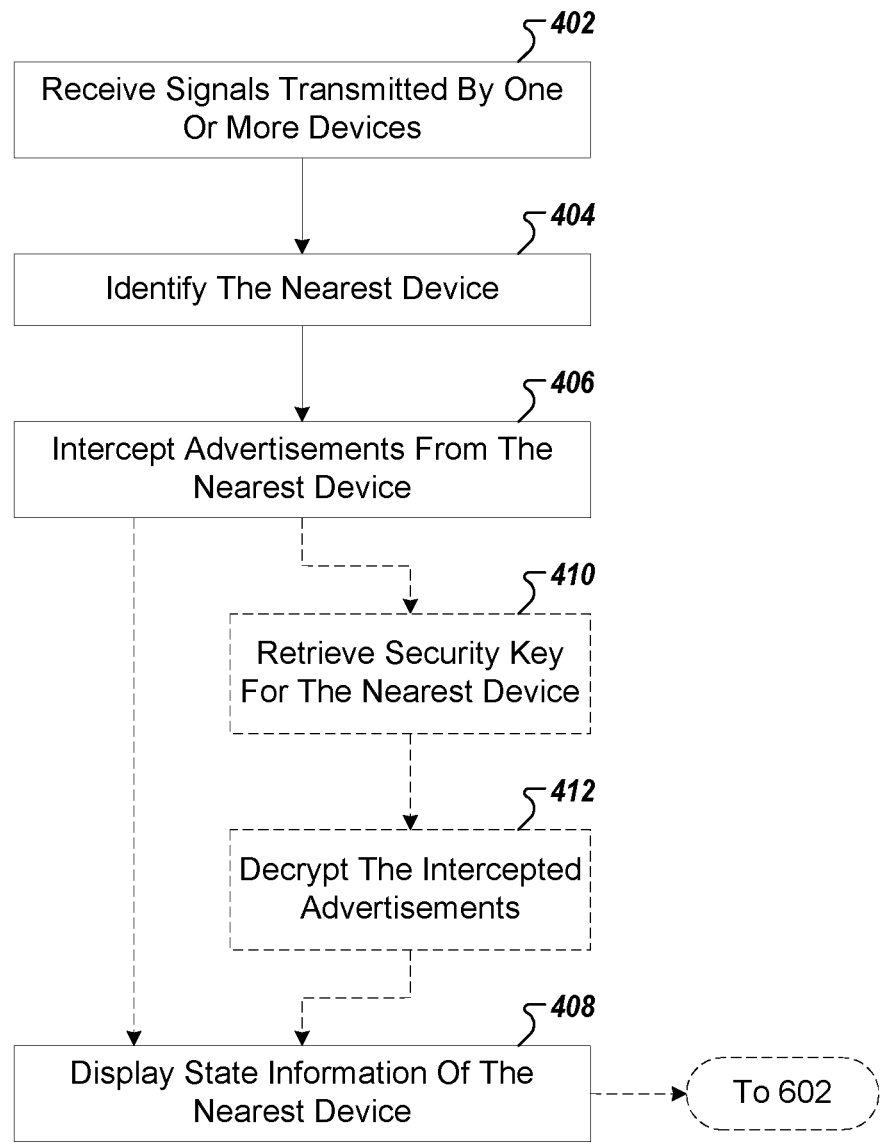
FIG. 4 illustrates a flowchart describing example operations for locally monitoring a device, in accordance with example embodiments of the present invention.

Turning now to FIG. 4, a flowchart is illustrated that contains a series of operations performed by a communication device to locally monitor devices without routing data transmissions through a remote IoT network. The operations illustrated in FIG. 4 may, for example, be performed by, with the assistance of, and/or under the control of apparatus 100, and more particularly through the use of one or more of processor 102, memory 104, communication interface 106, and/or user interface 108.

In operation 402 the apparatus 100 includes means, such as communication interface 106 or the like, for receiving signals transmitted by one or more devices. These signals may be transmitted by the devices using any of a number of wireless personal area network (PAN) technologies, such as Bluetooth v1.0 through v3.0, BLE, infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In operation 404 the apparatus 100 includes means, such as processor 102, or the like, for identifying a nearest device of the one or more devices based on the received signals. One mechanism for identifying the nearest device is described in conjunction with FIG. 5. Another method would be to measure the transfer time of radio signals, and calculate distance as a measure of this transfer time.

Figure 5:
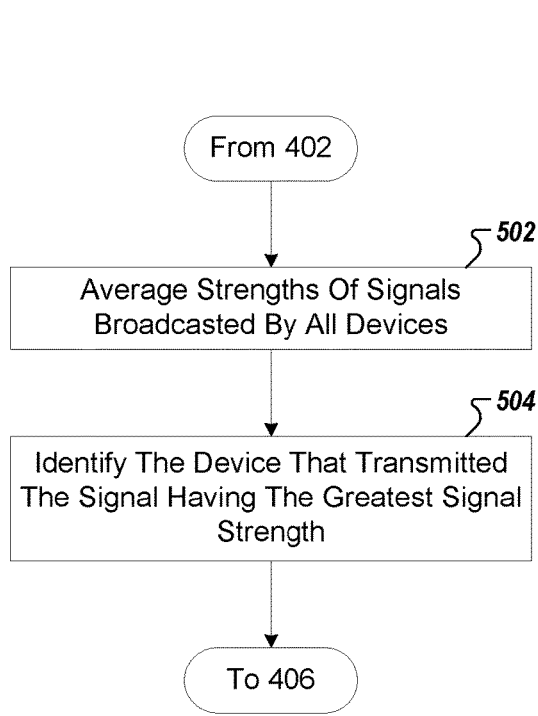
FIG. 5 illustrates a flowchart describing example operations for identifying the nearest device, in accordance with example embodiments of the present invention.

Turning to FIG. 5, a flowchart is provided that illustrates example operations for identifying the nearest device among a series of devices. Like the operations in FIG. 4, the operations illustrated in FIG. 5 may be performed by, with the assistance of, and/or under the control of apparatus 100, and more particularly through the use of one or more of processor 102, memory 104, communication interface 106, and/or user interface 108.

In operation 502 the apparatus 100 may include means, such as processor 102, memory 104, or the like, for averaging signal strengths of the received signals over a predetermined period of time. Averaging of this nature may filter out high and low peaks in the signal strengths to produce a more accurate identification of the signal strengths of the transmissions from various devices. In some embodiments, the predetermined period of time may be selected by the user via user interface 108.

Subsequently, in operation 504, the apparatus 100 includes means, such as processor 102, memory 104, or the like, for identifying the device that transmitted the signal having the greatest signal strength. The nearest device is assumed to be the device that transmitted the signal having the greatest signal strength. In this regard, the signal strengths of the received signals may be measured by the apparatus 100, such as by the processor 102 in combination with the communication interface 106. For instance, in embodiments utilizing BLE, the signal strengths of the received signals may comprise the BLE Received Signal Strength Indications (RSSI) measured by the communication device.

Returning to FIG. 4, in operation 406 the apparatus 100 includes means, such as processor 102, communication interface 106, or the like, for intercepting advertisements transmitted by the nearest device. It should be noted that, as with any wireless transmission, intercepting the advertisements broadcasted by the nearest device does not prevent those advertisements from traveling to other destinations. For instance, the advertisements may be simultaneously received by the local monitoring device (the apparatus 100) as well as by any hub device via which the nearest device would typically transmit data to the IoT network (as illustrated in FIG. 3). Regardless, intercepting the advertisements transmitted by the nearest device may include analyzing each received signal to determine its source, and discarding those signals that did not originate from the nearest device. Additionally or alternatively, intercepting the advertisements transmitted by the nearest device may comprise intercepting those advertisements received that have a signal strength greater than a predetermined threshold, as measured by the apparatus 100. In this regard, the predetermined threshold may be selected based on the average signal strength of the nearest device, as calculated in operations 502 and 504 above.

In either case, the procedure may then advance to operation 408, in which the apparatus 100 includes means, such as processor 102, user interface 108, or the like, for causing display, based on the intercepted advertisements, of state information of the nearest device. The displayed state information may comprise sensor readings, actuation information, or any other information that can be recorded or captured and then transmitted by the nearest device. In this regard, it may not be necessary to establish a BLE connection with the device, because in many cases, listening to the nearest sensor provides valuable information. Consider a practical example of be monitoring a manufacturing process in a factory having hundreds of sensors. Upon moving the apparatus 100 close to a particular device, the user interface 108 of the apparatus 100 may display state information from that particular sensor.

This state information may further display a broader set of information than simply sensor and actuator state. For instance, in addition to this dynamic information, static information such as sensor identification data may be displayed. This static information could include static parameters of sensors or static data related to the environment where a device is located. As an example from the latter category, if a device in a factory measures the temperature of a machine part, the device might record information related to the machine part (e.g., a name of the part, manufacturing date of the part or perhaps even a phone number to call if the machine part is broken) and that machine part data may be displayed.

However, although displaying the state information associated with a device is valuable in many circumstances, there are situations in which interaction with the nearest device is necessary. To handle such cases, the apparatus 100 may establish a BLE connection with the nearest device, as described in greater detail below in connection with FIG. 6.

Optional operations 410 and 412 are provided to handle situations where transmissions from the nearest device are encrypted. These advertisements may be encrypted to prevent unauthorized users from accessing the advertisements or, in an instance in which the nearest device is bonded to an IoT network, as a mechanism to identify the IoT network to which the nearest device belongs. For instance, when a new device is added to an IoT network, it may first need to be "bonded" with a gateway device (e.g., hub devices 206 or 306), which connects the device to the IoT network. To establish this connection, when devices are booted up for the first time, they may be configured to advertise as new non-bonded devices (indicating that the devices do not yet belong to any IoT network).

Upon receiving such advertisements, the gateway device may identify a series of non-bonded devices in its proximity and display them to a user in a list. The user can then select devices for binding to the IoT network. Alternatively, the gateway device may store rules governing which devices to bind to the IoT network, thus enabling the gateway device to automatically select devices for binding to the IoT network without user involvement.

Either way, when a particular device is selected for binding to the IoT network, the gateway device establishes a BLE connection to the device and uploads a security key (which may, for instance, take the form of an AES128 key, although other encryption specifications may alternatively be used) to the particular device. The security key can be stored by the gateway device or it can be stored elsewhere in the IoT network, in which case the gateway device can request the security key via the IoT network when needed. The device then changes its state to consider itself bonded to the IoT network and encrypts every transmission with the security key.

In some embodiments, the same security key may be used in all IoT devices within an IoT network. This way, the gateway device knows that all advertisement messages that it can decrypt are coming from IoT devices bonded to the IoT network (and BLE advertisements that cannot be decrypted accordingly to some other user/application). In other embodiments, the security key for each IoT device within an IoT network may have been pre-programmed in the factory into the IoT device, in which case different IoT devices may have different security keys. In these latter embodiments, when the gateway device connects to the particular device for bonding to the IoT network, the security key for that particular device may be uploaded from the device to the gateway device (and then stored by the gateway device or elsewhere in the IoT network). Such embodiments may enable heightened security for the IoT devices.

In any event, as illustrated in operation 410, the apparatus 100 may require the appropriate security key to access the contents of advertisements from the nearest device. In this situation, instead of advancing from operation 406 to 408, the procedure may advance first to operation 410, in which the apparatus 100 includes means, such as communication interface 106, for retrieving a security key for the nearest device. The apparatus 100 may in some embodiments retrieve the security key from the IoT network, while in other embodiments the apparatus may retrieve the security key directly from a local gateway device (e.g., hub 306). If the security key is the same for all IoT devices in the IoT network, retrieval of the security key may be performed at any time, including prior to identifying the nearest device. If the security key might be unique to the nearest device, retrieval of the security key may occur only after identifying the nearest device).

After retrieving the security key, the apparatus 100 includes means, such as processor 102 or the like, for decrypting the intercepted advertisements using the retrieved security key, after which the procedure advances to operation 408 for the display of state information. Accordingly, when advertisements from the nearest device are encrypted, the displayed state information of the nearest device will naturally be based on the decryption of the intercepted advertisements.

Figure 6:
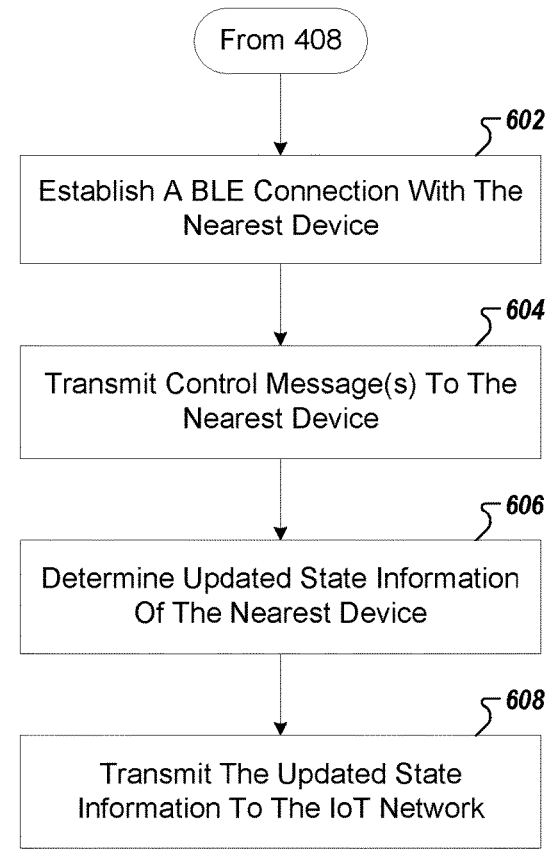
FIG. 6 illustrates a flowchart describing example operations for interacting with a device, in accordance with example embodiments of the present invention.

Although FIG. 4 illustrates operations for retrieving and displaying information about the nearest device, in some embodiments it may be desirable to interact with the device directly. Accordingly, some example operations for interacting with a device are illustrated in FIG. 6. As with the operations described previously, the operations illustrated in FIG. 6 may be performed by, with the assistance of, and/or under the control of apparatus 100, and more particularly through the use of one or more of processor 102, memory 104, communication interface 106, and/or user interface 108.

In operation 602, the apparatus 100 may include means, such as processor 102, communication network 106, or the like, for causing establishment of a BLE connection with the nearest device. In some embodiments, this connection may be established using a proprietary protocol based on BLE. Establishment of the BLE connection may cause the nearest device to generate a visual and/or audio indication. The visual and/or audio indication confirms, to the operator of the apparatus 100, the identity of the nearest device and also may confirm the creation of the BLE connection thereto.

In operation 604, the apparatus 100 may include means, such as processor 102, communication network 106, user interface 108, or the like, for causing transmission, to the nearest device, of a control message. This control message may also be transmitted using the proprietary protocol. In embodiments where generation of a visual and/or audio indication by the nearest device is not automatically prompted by establishment of the BLE connection, the control message may be an instruction to generate a visual and/or audio indication by the nearest device. In other embodiments, though, the control message may cause actuation of a portion of the nearest device, may cause collection of sensor readings from one or more sensors controlled by the nearest device, or may remove, update, or add software to a storage device associated with the nearest device. In yet other embodiments, the control message may be an actuation message. In this regard, the actuation message may be an instruction to the nearest device to change its physical state. Alternatively, the actuation message may be an instruction to actuate another device operatively controlled by the device. In both cases, the transmission of actuation messages facilitates testing of a series of devices that may or may not be connected to an IoT network. For instance, in one embodiment where an IoT device does not appear to function properly when controlled from an IoT network, an operator may control the IoT device using actuation messages to verify whether the IoT device has suffered a mechanical failure.

It should be understood that while a user may visually inspect the nearest device to identify physical changes thereto, to accurately determine the effects caused by the transmission of control messages to the nearest device (including non-visual changes such as sensor readings or software modifications), the apparatus 100 will need to determine an updated state of the nearest device. Accordingly, in operation 606, the apparatus 100 may include means, such as communication network 106 or the like, for receiving, after causing transmission of the control message, updated state information from the nearest device. Receiving this updated state information may occur by intercepting advertisements transmitted by the nearest device, as described above in connection with operations 406 and 408 (and 410, in embodiments where the advertisements are encrypted).

It should be noted that because these control messages are transmitted directly from the apparatus 100 to the nearest device and the updated state information generated by the nearest device may not be transmitted to an IoT network (such as in situations where the nearest device has not yet been connected to the IoT network or where that connection is down), the IoT network may have no knowledge of the changed state of the nearest device. As a result, if the device is bonded to an IoT network, in operation 608 the apparatus 100 may include means, such as processor 102, communication network 106, or the like, for causing transmission of the updated state information to the IoT network.

Accordingly, by utilizing the architecture described herein, certain example embodiments of the present invention provide several benefits over traditional mechanisms for monitoring local devices through a cloud system. For instance, example embodiments may make it easier and more convenient to install and test large and complex sensor-to-cloud IoT systems. Further, example embodiments enable testing of large IoT system components individually before they are configured as functional parts of the IoT network. Moreover, certain embodiments enable local monitoring without a cloud connection, which may be important for situations when networks are down or require additional security. From a practical perspective, embodiments in which a visual and/or audio indication is generated by devices being monitored lessen the burden of finding nearby sensors that a user would be most interested in.

As described above, FIGS. 4-6 illustrates flowchart describing the operation of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus 100 employing an embodiment of the present invention and executed by a processor 102 of the apparatus 100. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, by a communication device, signals from each of a plurality of devices;
    averaging, over a predetermined period of time each of, signal strengths of the signals received from each of the plurality of devices;
    identifying, by the communication device, a nearest device in the plurality of devices based on the averaged signal strengths of the received signals, wherein the nearest device is a device, in the plurality of devices, having a closest physical proximity to the communication device;
    intercepting, by the communication device, advertisements from the nearest device;
    displaying, by the communication device and based on the intercepted advertisements, state information from the nearest device; and
    transmitting, by the communication device and based on the intercepted advertisements, a control message to the nearest device to cause an operation at the nearest device.

2. The method of claim 1, wherein identifying the nearest device based on the signal strengths of received signals comprises:
    identifying, in the plurality of devices, a device associated with a signal having a highest average signal strength, wherein the nearest device comprises the device associated with the signal having the highest average signal strength.

3. The method of claim 2, wherein the signal strengths of the received signals comprise bluetooth low energy received signal strength indications measured by the communication device.

4. The method of claim 1, further comprising:
retrieving a security key for the nearest device; and
decrypting the intercepted advertisements using the retrieved security key,
wherein the displaying the state information from the nearest device is based on decrypting the intercepted advertisements.

5. The method of claim 1, further comprising:
causing the transmission of the control message via a bluetooth low energy connection with the nearest device.

6. The method of claim 1, wherein the control message causes a second operation at another device operatively controlled by the nearest device.

7. The method of claim 1, wherein the control message comprises an actuation message.

8. An apparatus comprising at least one processor and at least one memory including computer program code, the at least one memory and the computer program code configured to, with the at least one processor, cause the apparatus to at least:
receive signals from a plurality of devices;
average, over a predetermined period of time for each of the plurality of devices, signal strengths of the received signals;
identify a nearest device in the plurality of devices based on the averaged signal strengths of the signals received from each of the plurality of devices, wherein the nearest device is a device, in the plurality of devices, having a closest physical proximity to the apparatus;
intercept advertisements from the nearest device;
display, based on the intercepted advertisements, state information from the nearest device; and
transmit, based on the intercepted advertisements, a control message to the nearest device to cause an operation at the nearest device.

9. The apparatus of claim 8, wherein the at least one memory and the computer program code cause the apparatus to identify the nearest device by causing the apparatus to at least:
identify, in the plurality of devices, a device associated with a signal having a highest average signal strength,
wherein the nearest device comprises the device associated with the signal having the highest average signal strength.

10. The apparatus of claim 9 wherein the signal strengths of the received signals comprise bluetooth low energy received signal strength indications measured by the apparatus.

11. The apparatus of claim 8, wherein the at least one memory and the computer program code are further configured to, with the at least one processor, cause the apparatus to at least:
retrieve a security key for the nearest device; and
decrypt the intercepted advertisements using the retrieved security key,
wherein displaying the state information from the nearest device is based on decrypting the intercepted advertisements.

12. The apparatus of claim 8, wherein the at least one memory and the computer program code are further configured to, with the at least one processor, cause the apparatus to at least:
transmit the control message via a bluetooth low energy connection with the nearest device.

13. The apparatus of claim 8, wherein the state information includes state information associated with another device operatively controlled by the nearest device.

14. The apparatus of claim 13, wherein the at least one memory and the computer program code are further configured to, with the at least one processor, cause the apparatus to at least:
receive, after causing transmission of the control message, updated state information from the nearest device; and
transmit the updated state information to a network.

15. The apparatus of claim 8, wherein the control message comprises an instruction to the nearest device to generate a visual and/or audio indication.

16. The apparatus of claim 8, wherein the control message comprises an actuation message.

17. The apparatus of claim 16, wherein the actuation message comprises an instruction to the nearest device to change its physical state.

18. The apparatus of claim 17, wherein the actuation message comprises an instruction to the nearest device to actuate another device operatively controlled by the nearest device.

19. The apparatus of claim 8, wherein at least one of the plurality of devices is bonded to an Internet of Things network.

20. A computer program product comprising at least one non-transitory computer-readable storage medium having computer-executable program code portions stored therein, the computer-executable program code portions comprising program code instructions that, when executed, cause an apparatus to at least:
receive signals from a plurality of devices;
identify a nearest device in the plurality of devices based on average signal strengths of the received signals, wherein the nearest device is a device, in the plurality of devices, having a closest physical proximity to the apparatus;
intercept advertisements from the nearest device;
display, based on the intercepted advertisements, state information from the nearest device; and
transmit, based on the intercepted advertisements, a control message to the nearest device to cause an operation at the nearest device.

* * * * *